INVENTOR.
HANS KARAL

Fig. 5

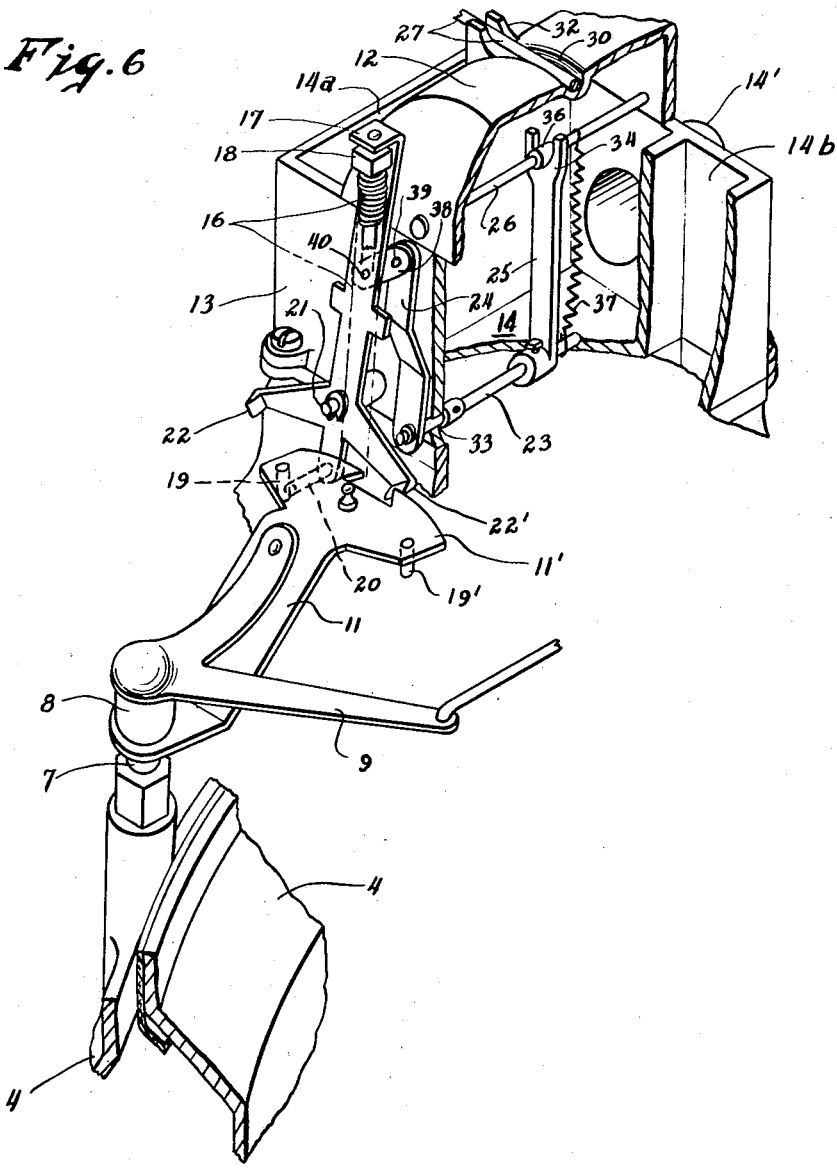
Dec. 30, 1958  H. KARAL  2,866,443
TWO-CHAMBER GAS METER WITH INDEPENDENT
MEASURING CHAMBER MEANS
Filed Dec. 21, 1953  6 Sheets-Sheet 6
INVENTOR.
HANS KARAL

United States Patent Office 2,866,443
Patented Dec. 30, 1958

2,866,443

TWO-CHAMBER GAS METER WITH INDEPENDENT MEASURING CHAMBER MEANS

Hans Karal, Berlin-Neukoelln, Germany, assignor, by mesne assignments, to Aronco Meter Products Corporation, New York, N. Y., a corporation of New York Application December 21, 1953, Serial No. 399,258
In Germany December 31, 1948

Public Law 619, August 23, 1954
Patent expires December 31, 1968

7 Claims. (Cl. 121—48)

The invention relates to a two-chamber gas meter of the known general type in which the space traversed by the gas to be metered is divided by a single measuring element, such as a movable partition or membrane, into two chambers each alternately placed in communication with the gas inlet and outlet of the meter by an automatic mechanism. The resulting reciprocating motion of the movable partition or membrane is transmitted to a counter which indicates gas consumption in units of volume.

The automatic interchange of connection to the two chambers is effected in known two-chamber gas meters by means of ordinary valves, but these involve certain disadvantages. In four-chamber gas meters, therefore, slide-valve systems have been preferred, but in two-chamber gas meters, it has been found that the actuation of the slide involves difficulties because the slide readily tends to separate from its track during operation, so that proper intercommunication of the gas passages is not afforded with the required reliability. For these and other reasons, two-chamber gas meters with slide-valve control have therefore not hitherto come into practical use.

The invention provides a two-chamber gas meter with slide-valve control having a number of substantial advantages over known gas meters of the two-chamber type. According to the basic idea of the invention, the slide is actuated by a quick-action trigger mechanism, for example with the air of a rocker release system. The slide track is placed parallel to the motion of the measuring element, or membrane, on top of the meter casing, approximately midway between the gas inlet and outlet of the housing, in order to minimize losses due to deflection of gas flow.

To overcome these difficulties, the invention proposes that the guidance of the slide on the track be facilitated by transmitting the actuating thrust to the slide at or near its center of effort. The slide can thus be driven in each direction of motion by means of linkage and from the inside, i. e. through the duct, with the aid of a shaft mounted in the duct with the aid of a stuffing box or similar arrangement and cranked to the center of effort of the slide. The crank may advantageously be forked at the slide end to engage a pin mounted in the slide perpendicular to its motion at its center of effort, when the slide is set in place. This connection can further be rendered positive with the aid of a tension spring attached to the crank and the slide.

For purposes of mounting the shaft driving the slide in a gastight manner in the duct, it is advisable, according to a further feature of the invention, to relieve the stuffing box or other gastight joint from the forces of the compression spring of the rocker release system. This is accomplished by lateral displacement of the center of rotation of the rocker arm with respect to the said gastight bearing of the shaft and driving the said shaft by means of a parallelogram linkage interposed between the rocker arm and the shaft bearing. The invention likewise comprises other improvements that have proved advantageous, some of them applicable not only to a gas meter of the type here referred to but also to gas meters of other designs.

In the accompanying drawings, some embodiments of the gas meter according to the invention will now be more fully described by way of illustration and not of limitation.

In these drawings,

Fig. 5 shows a side view of the same, likewise in section.

Fig. 6 is a perspective of the slide mechanism.

Figure 1:
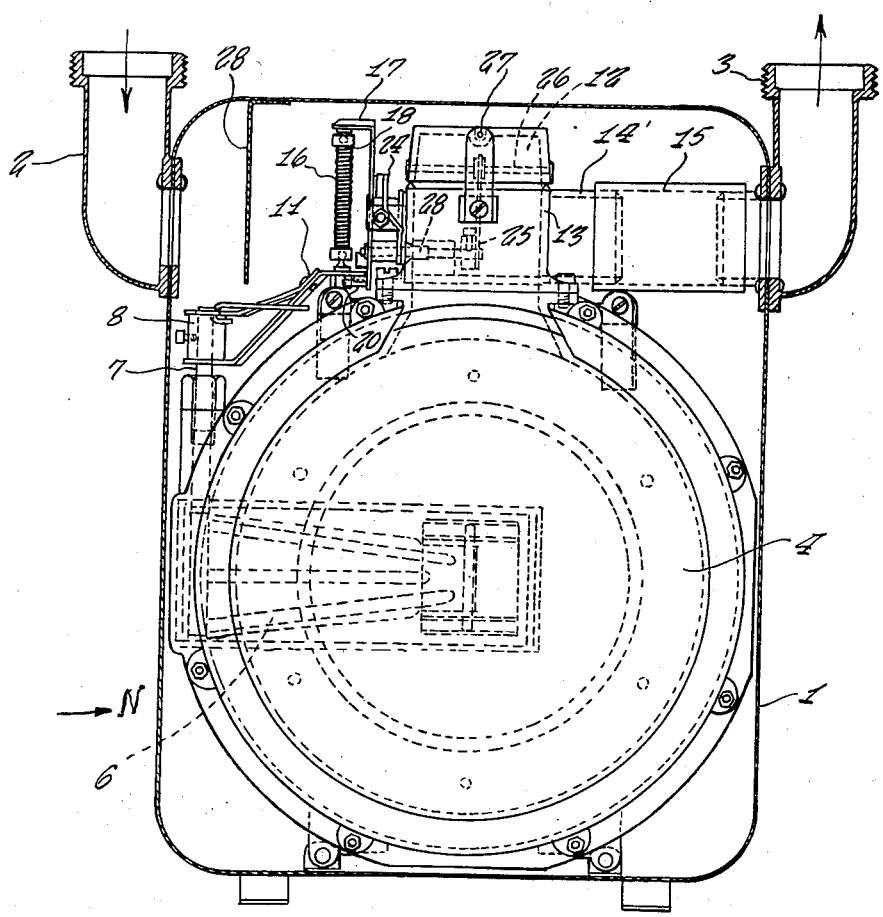
Fig. 1 shows a view of the interior of the gas meter, the part of the housing bearing the counter having been removed.
Figure 2:
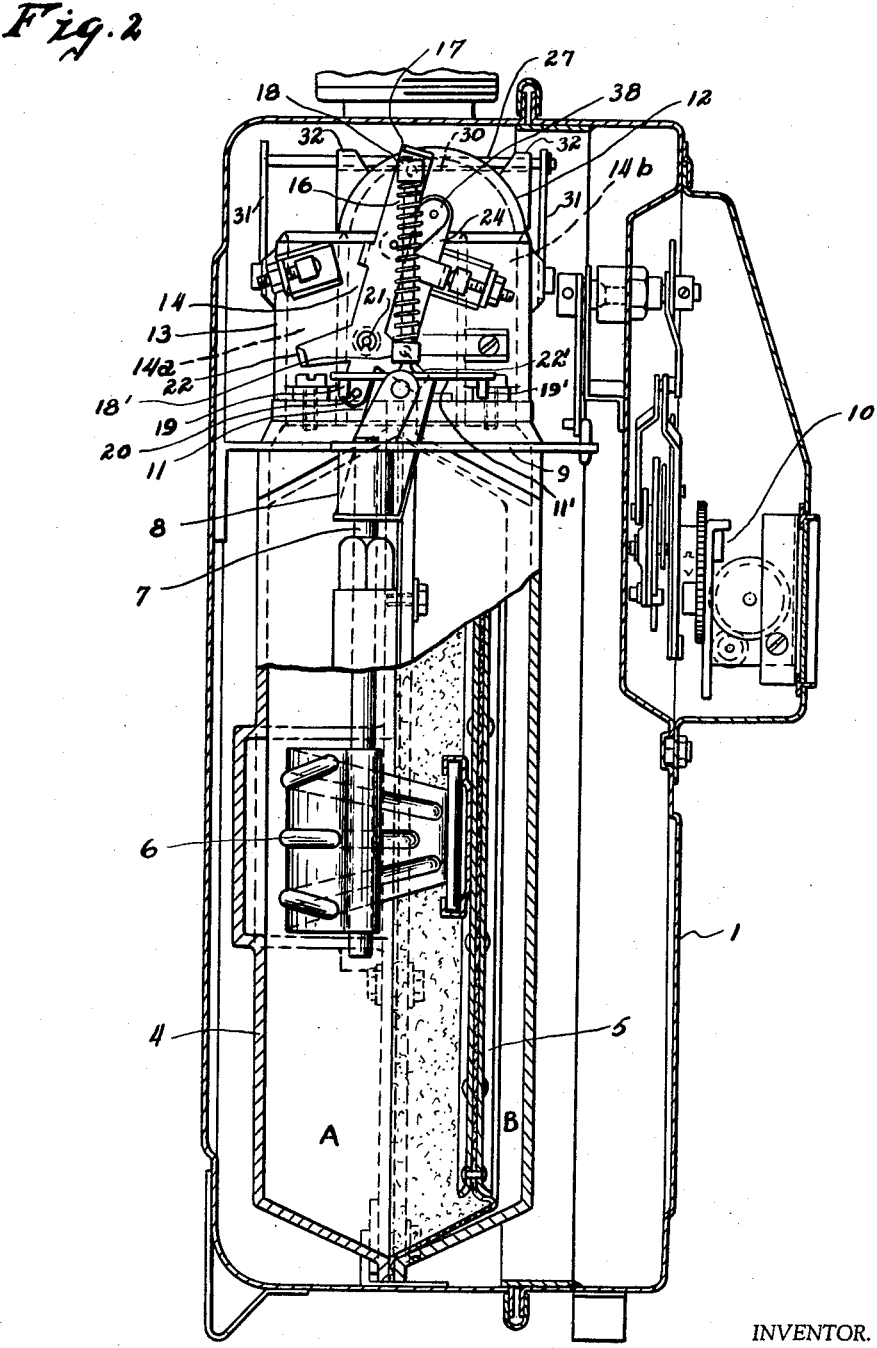
Fig. 2 shows a side view seen from the direction of the arrow N in Fig. 1, drawn with the left-hand side wall of the housing removed.
Figure 3:
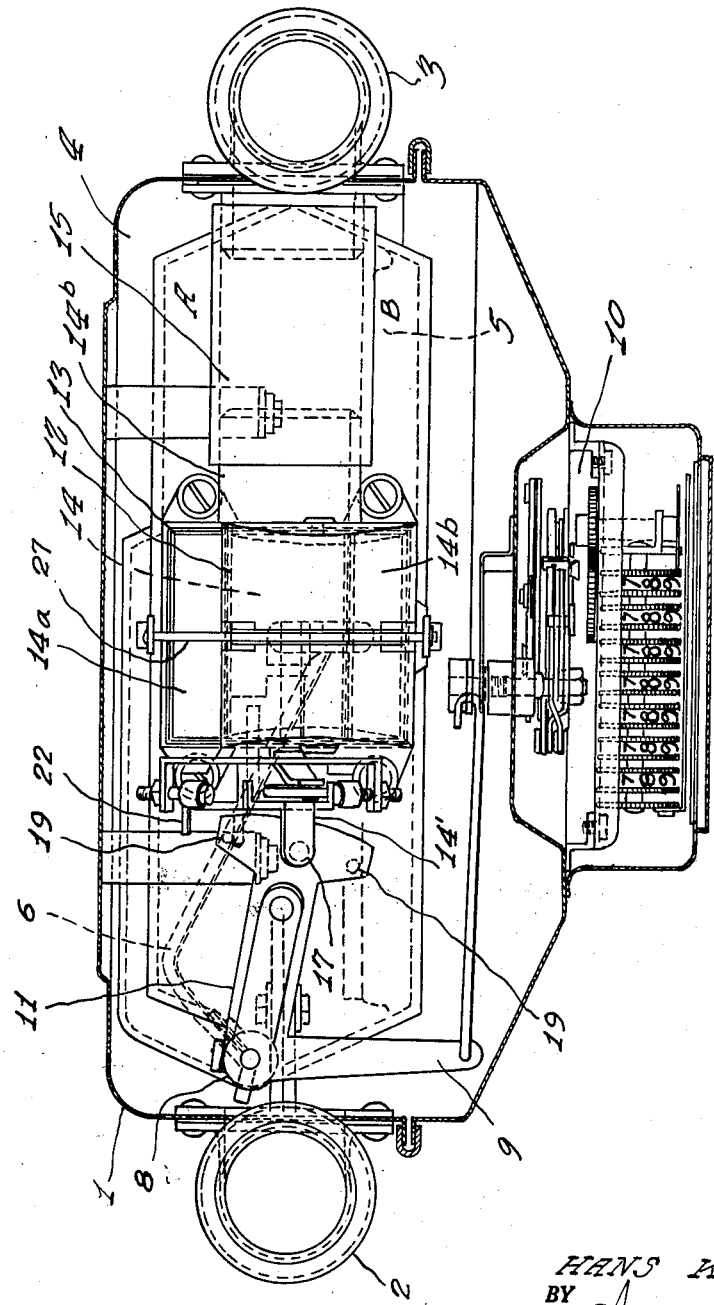
Fig. 3 shows a top view of the gas meter with the top wall of the housing removed.

With reference to Figs. 1, 2 and 3, 1 is the housing of the gas meter, composed of two parts, with gas inlet 2 and gas outlet 3. Inside the housing 1 is mounted a casing 4, in two halves, divided by a movable partition 5 into two chambers A and B. In the position shown, chamber A is filled with gas and chamber B is empty. The motion of the partition 5 is transmitted by the linkage 6 through the shaft 7, passed out of the casing in a gastight manner, to a crank lever 8, and from the latter both through lever 9 to the counter 10 and through lever 11 via a rocker release system to the valve slide 12. The mechanism and construction of the counter are in themselves known in relation to gas meters, and therefore need not be further described.

The casing 4 is flanged with a duct 13 in which partitions form three passages 14, 14a and 14b. The middle passage 14 is in communication with the outlet 14', which in turn is connected to the gas outlet 3 of the meter by the length of flexible tubing 15. The two passages 14a and 14b on either side are in communication with the chambers A and B, respectively. The top end of the duct 13, faced and ground to a plane, bears the hollow hemicylindrical slide 12. In the extreme position shown, the slide leaves passage 14a uncovered, so that the gas entering the housing 1 at 2 can flow through passage 14a into chamber A; while at the same time the slide places passage 14b in communication with passage 14, so that the gas contained in chamber B can escape through 14b and reach the outlet 3 through passage 14 via the connection 15.

The slide 12 is operated by a quick-action trigger mechanism with the aid of the rocker release system to be described. The rocker release system comprises the aforesaid lever 11, supporting one end of the rocker spring 16, its other end being connected to the rocker arm 17. The spring 16 encloses two telescoping pins 18 and 18', each having a shoulder at the end, so that the spring bears on the shoulders of the pins. The head of each pin is socketed on its outer face so as to engage a ball member, forming a ball-and-socket joint. If the spring 16 is to be removed and replaced, this can be done without disturbance of fastening means and without tools by simply thrusting the pins somewhat towards each other against the pressure of the spring 16 and thereby bringing them out of engagement.

A shaft 23 is driven by a parallelogram linkage 39, 40 interposed between a rocker arm 17 and said shaft 23. In this way the shaft 23 is released of unilateral spring action. In order to damp concussions from the rocker release system, the side of the slide duct is fitted with two preferably adjustable bumpers 41 and 42 against which the rocker arm 17 strikes its extreme positions.

The lever 11 acts on the rocker arm 17 not only through the spring 16 but also through the stops 19 and 19', so that just prior to each dead-center position of the lever 11, one of the stops 19 and 19' strikes a pin 20 attached to a downward prolongation of the rocker arm 17 rotatably mounted on a shaft 21. As a result, there is in each instance a sudden shift of the slide 12 from one extreme position to the other, even if the slide should be held back somewhat by friction. The lever 11 at the same time operates in conjunction with the rocker arm 17 somewhat after the fashion of an anchor escapement in a clock. For this purpose, the rocker arm 17 has detents 22 and 22' on either side, one of which in each instance rests against the blade 11' of the lever 11 from below, until it is able to escape upward through the central cut-out in the blade when, in the course of the swing of the lever 11, the spring 16 has overcome its tilt and tends to release. This movement then effects the instantaneous shift of the slide 12.

The slide 12 is actuated as follows: the rocker arm 17 is liked to a crank 24 rigidly connected to an internal crank 25 by means of a shaft 23 passing through the wall of the duct 13. The internal crank 25 engages a pin 26 mounted transversely in the slide 12 and finally transmitting the motion to the latter. The slide is guided by an external pin 27, for which purpose it has a central groove 30 fitting the guide pin 27.

In Fig. 2, the spring 16 is shown in the position it occupies when the lever 11 is moving (in Fig. 3) clockwise to shift the slide 12 into its (in Fig. 2) leftmost position. At the next instant, then, the spring 16 would tilt its lower end to the right and its upper end to the left into the extreme position determined by the stops.

Figure 4:
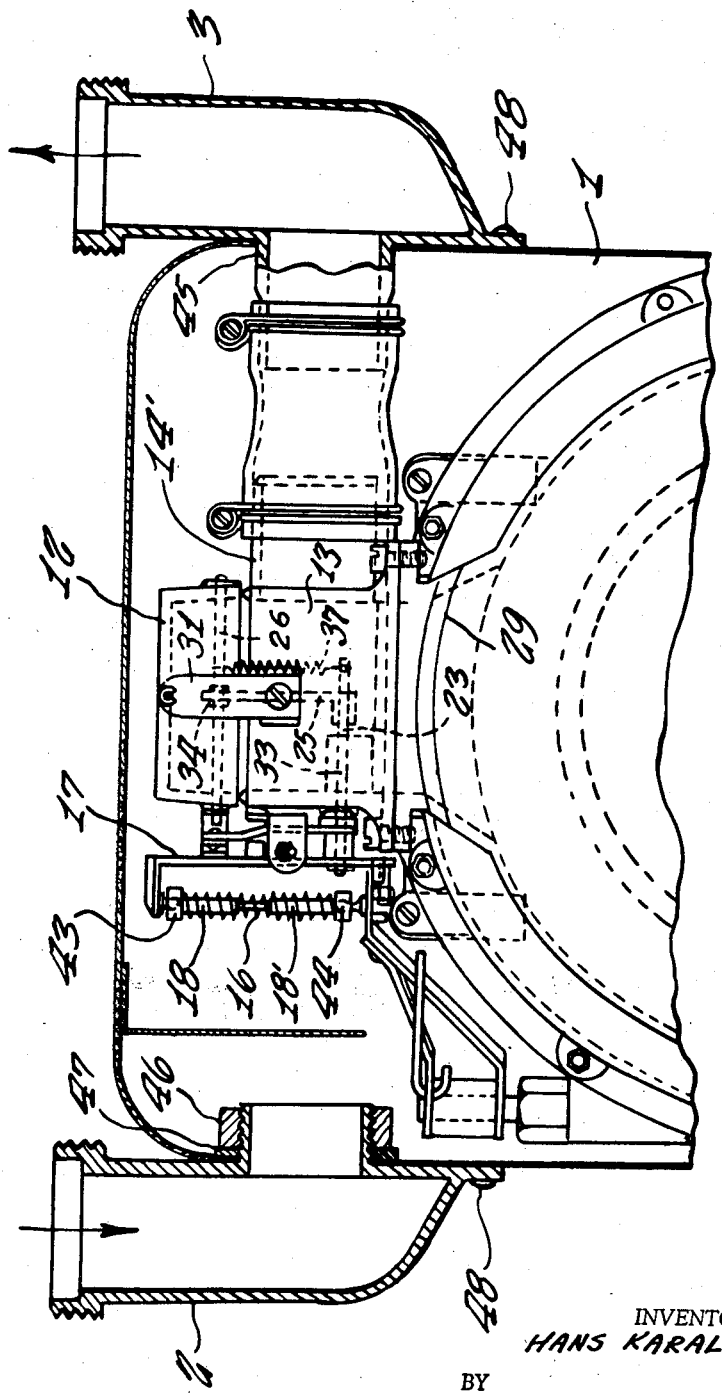
Fig. 4 shows the upper part of the gas meter in cross-section.
Figure 5:
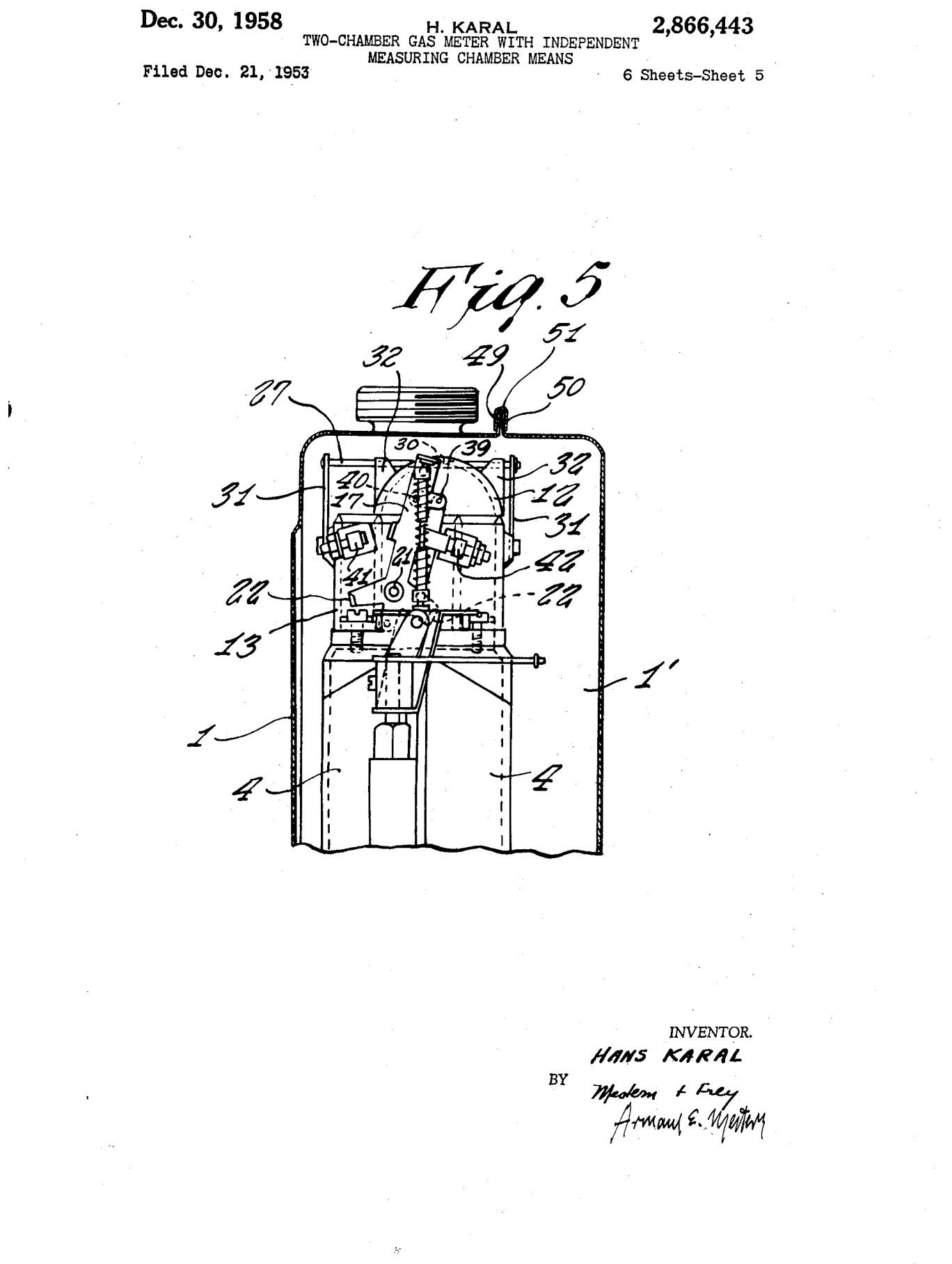

Referring to Figs. 4 and 5, the duct 13 and the two halves 4 forming the diaphragm casing are of synthetic resin plastic, and are likewise provided with a flange connection 29. The chambers 4 are substantially circular, which serves, as has been found, to secure plane flanges 29 since the parts of the casing may tend to warp after molding.

The hollow hemicylindrical valve slide 12 is mounted on the top of the duct 13 movable parallel to the direction of motion of the measuring element (membrane or the like) in the meter casing 4. The slide 12 is provided with a guide groove 30, and likewise made of synthetic-resin plastic. The guide groove 30 is engaged by a guide pin 27 attached to the duct by support strips 31, to ensure rectilinear motion of the slide 12. Further, the slide 12, as shown in particular in Fig. 5, may also be provided with extra lugs 32.

The slide is actuated from the inside, through the duct 13, near or at the center of effort of the slide 12. For this purpose, a shaft 23 is inserted gastight at 33 into the duct and fitted with a crank 25 extending upward to the vicinity of the center of effort of the slide 12. The crank 25 is provided with a fork 34 at its upper end, engaging a pin 36 located at the center of effort of the slide. Between the fork 34 and the pin 35, a bushing 36 may be inserted, of flexible or sound-proofing material. The slide 12 is placed on the duct 13 from above, so as to engage the fork 34. The connection between the fork 34 and the pin 35 may advantageously be rendered positive with the aid of an interposed tension spring 37.

To relieve the gastight insertion of the shaft 23 from the forces of the compression spring 16 of the rocker release system comprising levers 24 and 17 with detents 22, the center of rotation 21 of the rocker arm 17 is laterally displaced relative to the shaft insertion 23, as shown in particular in Fig. 4.

The spring of the rocker release system is a compression spring enclosing telescoping pins 18, 18' to keep it from buckling. These pins 18, 18' are provided with sockets 43 at their ends to receive the balls 44 attached to rocker arm 17 and lever 38, so that by merely compressing the pins 18, 18', the spring can be easily and rapidly removed and replaced. This construction particularly favors ease and speed of manufacture. All fastening means for the various parts of the mechanism, as well as a nipple 14', for the central outlet, are molded into the duct 13. The gas outlet 3 of the meter housing likewise has a nipple 45, and the connection between meter casing and housing outlet 3 is effected by a length of flexible tubing, which may advantageously be of elastic synthetic-resin plastic, slipped over the nipples 14' and 45.

The attachment of the gas inlet 2 and outlet 3 to the gasmeter housing 1 is effected without soldering, the connections 2 and 3 being inserted in the housing by their nipples and fastened thereto with a box nut or the like. A gasket may be used to provide a better seal. In the embodiment of Fig. 4, on the other hand, a nut 46 is screwed on the inlet and/or outlet nipples, with interposition of a gasket 47. This connection alone, however, would not suffice, since further connection of gas lines would transmit considerable stresses to the screw connections, which might loosen them undesirably. To relieve the screw connections from such stresses, the connections 2 and 3 are additionally attached to the gas meter housing by means of special positioning lugs or pins 48, so that after attachment of the connections 2 and 3 to the housing 1 and tightening of the nut 46, the connections 2 and 3 are held in position. Connections 2 and 3 may alternatively be riveted or screwed to the housing 1 for this purpose, but such fastenings must be made perfectly gastight, whereas in the former case it is sufficient merely to provide depressions in the housing at the desired points to receive the positioning lugs or pins of the connections 2 and 3, without making any additional openings in the housing 1.

In order to assemble the gas-meter housing 1 perfectly gastight without soldering, each of the two parts 1 and 1' of the housing, as indicated in Fig. 5, may be provided with a flange 49 and 50, respectively, around its entire periphery, which flanges are in continuous contact with each other, with or without interposition of a plastic material that will afterwards harden. The two parts of the housing are then fastened together with two U-bars 51, each of U-shaped cross-section as well, thrust on in opposing directions. The two U-bars 51 may advantageously be thrust first on the two longer sides of the gasmeter housing, until they also enclose the shorter sides of the housing and hence the entire flanges 49 and 50 throughout its periphery.

To secure a better seal, the U-bars may afterwards be pinched together, and their ends may partially overlap. In this way it is possible to obtain a continuous gastight closure on the entire periphery of the housing, with no danger of displacement of parts relative to each other. By removing the U-bars, the housing parts can at any time be separated for inspection and repairs to the interior of the meter. The proposal of sealing the flanges 49 and 50 with a plastic setting or non-setting cement is particularly advantageous because it has been found that gaskets may readily slip when mounting the parts of the housing and assembling with the aid of the U-bars, so that a satisfactory seal is not afforded throughout the periphery.

Near the gas inlet 2, a plate 28 is provided, serving as a baffle on which solid particles (impurities) entrained by the stream of gas will impinge so as to settle to the floor of the housing and not foul the slide and its mechanisms.

The two halves 4 of the casing, the duct 13 flanged to it, and the slide 12 resting on the latter may advantageously be made of a suitable synthetic-resin plastic. This not only permits high precision of manufacture but also avoids difficult soldering work necessary in the conventional design, where these parts have generally been of tinplate.

The advantages of the gas meter described, apart from simplicity of construction and economy of materials, consist primarily in that the gas is afforded extraordinarily favorable flow paths in entering and leaving the meter casing, so that vortexes in the gas flow are largely eliminated. A consequence of such favorable flow paths is very low pressure drop and high overload capacity of gas meters constructed according to the invention. Experience has shown that the design according to the invention readily permits construction of a half-gallon gas meter that can be used at flow rates of up to 275 cu. ft. per hour within the allowable limits of error. Another advantage consists in reduced wear of moving parts.

The proposal of making the casing, the duct and/or the slide of synthetic-resin plastic is of advantage in gas meters of other types also. The same is true of the provision of a baffle at the gas inlet, as well as of the flexible connection between meter casing and gas outlet.

The invention is moreover not restricted to the example of embodiment described. On the contrary, the embodiment described can be modified in various respects without transcending the scope of the invention.

What I claim is:

1. A two-chamber gas meter comprising a meter housing; a first and second chambers in said housing; a movable partition between said chambers; a gas inlet in said meter housing; a gas outlet in said meter housing; a tripartite duct connected with said chambers; a valve assembly for controlling the inflow and outflow of gas to and from said chambers, said valve assembly comprising a slide valve communicating with said tripartite duct, said chambers and said gas inlet and outlet for alternately communicating each of said gas chambers with said gas inlet and said gas outlet; a rocker release mechanism consisting of a rocker arm, a rocker spring; a lever supporting one end of said spring and connected to the rocker arm; an operative connection between said rocker arm and said valve; linkage means connecting said movable partition and said lever, for transmitting movement from the partition to said valve.

2. A two-chamber gas meter according to claim 1, in which a shaft mounted in said duct with the aid of a gas-tight stuffing box is cranked to the center of effort to the said slide valve.

3. A two-chamber gas meter according to claim 2, in which said shaft is forked at said slide valve.

4. A two-chamber gas meter according to claim 3, in which a tension spring is provided between said shaft and said slide valve.

5. A gas meter according to claim 4, in which a parallelogram linkage is interposed between the rocker arm and the stuffing box of the shaft, in order to laterally displace the center of rotation of said rocker release system.

6. A two-chamber gas meter according to claim 5, in which the rocker spring encloses two telescoping pins, each pin being provided with a shoulder at the end, said spring bearing on the shoulders of said pins, the head of each pin being socketed on its outer face and engaging ball members provided on said rocker-arm and lever, respectively.

7. A gas meter comprising a housing, two gas chambers arranged in said housing, a movable partition between said two gas chambers alternatively placing each gas chamber in communication with a gas inlet and a gas outlet, a slide valve arrangement for effecting said alternate communication, and a quick-action trigger mechanism for control of the actuation of said slide valve, said slide valve comprising a hollow hemicylindical valve member on a valve seat, a duct; linkage means connecting the movable partition and said trigger mechanism for actuating the slide valve; a guide connected to said slide valve: a guide pin connected to said duct and engaging said guide to insure symmetrically distributed pressure on the surface of the valve seat covered by the valve member in any position of its motion.

References Cited in the file of this patent

UNITED STATES PATENTS

| 143,390   | Telling  | Sept. 30, 1873 |
| 318,327   | Thomson  | May 14, 1885   |
| 952,806   | Henning  | Mar. 22, 1910  |
| 1,878,344 | Strelow  | Sept. 20, 1932 |

FOREIGN PATENTS

| 17,995  | Australia     | Aug. 20, 1929 |
| 363,943 | Great Britain | Dec. 31, 1931 |
| 920,327 | Germany       | Nov. 18, 1954 |